(12) United States Patent
Tsukahara et al.

(10) Patent No.: US 9,318,839 B2
(45) Date of Patent: Apr. 19, 2016

(54) CABLE

(71) Applicant: Junkosha, Inc., Ibaraki (JP)

(72) Inventors: Yuta Tsukahara, Ibaraki (JP); Hiromi Yasumoto, Ibaraki (JP)

(73) Assignee: Junkosha, Inc., Ibaraki (JP)

( * ) Notice: Subject to any disclaimer, the term of this patent is extended or adjusted under 35 U.S.C. 154(b) by 0 days.

(21) Appl. No.: 14/424,606

(22) PCT Filed: Aug. 28, 2013

(86) PCT No.: PCT/JP2013/073052
§ 371 (c)(1),
(2) Date: Aug. 26, 2015

(87) PCT Pub. No.: WO2014/034740
PCT Pub. Date: Mar. 6, 2014

(65) Prior Publication Data
US 2015/0357750 A1    Dec. 10, 2015

(30) Foreign Application Priority Data

Aug. 31, 2012   (JP) ................................ 2012-192642
Mar. 18, 2013   (JP) ................................ 2013-054597

(51) Int. Cl.
*H01R 39/00*    (2006.01)
*H01R 13/56*    (2006.01)
(Continued)

(52) U.S. Cl.
CPC ............ *H01R 13/565* (2013.01); *H01R 13/562* (2013.01); *H01R 13/465* (2013.01); *H01R 13/5025* (2013.01); *H02G 15/02* (2013.01)

(58) Field of Classification Search
CPC ...... H01R 39/64; H01R 39/643; H01R 35/04; H01R 13/5841; H01R 13/562
USPC ................... 439/11, 13, 14, 446, 447; 385/35
See application file for complete search history.

(56) References Cited

U.S. PATENT DOCUMENTS 4,540,225 A * 9/1985 Johnson ................. H01R 39/64
219/70

(Continued)

FOREIGN PATENT DOCUMENTS

JP    H05-036777    5/1993
JP    H07-025595    5/1995
(Continued)

OTHER PUBLICATIONS

PCT International Preliminary Report on Patentability in PCT/JP2013/073052, dated May 12, 2014, 8 pages.
(Continued)

*Primary Examiner* — Hien Vu
(74) *Attorney, Agent, or Firm* — Servilla Whitney LLC (57) ABSTRACT

The present invention addresses the problem of significantly reducing torque between a cable and a connector, preventing breakage/damage to the cable, and thus increasing the durability and safety of the cable relative to the prior art when an end part of a cable is grasped and subjected to a bending or twisting action. The cable according to the present invention is provided with a cable body, a connector part attached to an end part of the cable body in the longitudinal direction thereof, and a cable holding device (strain relief) for covering a peripheral surface of the cable body, the cable holding device being provided so as to be able to rotate about the central axis of the cable body in relation to the cable body. When an operator grasps the cable holding device or a portion thereof and connects the connector part to a testing device, etc., even when torsion occurs in the cable, since the cable body side to which the connector part is attached can freely rotate along with the torsion of the cable in relation to the cable holding device, which is grasped by the operator and restricted from moving, the connector attachment portion of the cable is not prone to undergo stress.

10 Claims, 6 Drawing Sheets

(51) Int. Cl.
*H02G 15/02* (2006.01)
*H01R 13/46* (2006.01)
*H01R 13/502* (2006.01)

(56) References Cited

U.S. PATENT DOCUMENTS

| | | | | |
|---|---|---|---|---|
| 5,030,135 A | * | 7/1991 | Plesinger | B29C 65/02 174/135 |
| 5,876,069 A | | 3/1999 | Kobayashi | |
| 6,139,354 A | * | 10/2000 | Broussard | H01R 13/523 439/447 |
| 8,672,705 B2 | * | 3/2014 | Schneider | G02B 6/3887 439/460 |
| 2007/0217745 A1 | * | 9/2007 | Semmler | G02B 6/3801 385/53 |
| 2011/0189876 A1 | | 8/2011 | Schneider | |

FOREIGN PATENT DOCUMENTS

| | | |
|---|---|---|
| JP | H09-274964 | 10/1997 |
| JP | 2005-197059 | 7/2005 |
| JP | 2009-110888 | 5/2009 |
| JP | 2011-159626 | 8/2011 |

OTHER PUBLICATIONS

PCT International Search Report in PCT/JP2013/073052, mailed Oct. 29, 2013, 2 pages.

* cited by examiner

CABLE

CROSS-REFERENCE TO RELATED APPLICATIONS

This application is the national stage entry of PCT/JP2013/073052, filed on Aug. 28, 2013, which claims priority to Japanese Patent Application Number JP2012-192642, filed on Aug. 31, 2012, and Japanese Patent Application Number JP2013-054597, filed on Mar. 18, 2013, both of which are incorporated herein by reference in their entireties.

TECHNICAL FIELD

The present invention relates to a cable to which a connector is attached, particularly to a cable provided with a protector for preventing the cable from breakage or damage caused by an impact, bending or twisting.

BACKGROUND ART

In general, when a cable is connected to a device or an apparatus, it is required that a connector provided at a tip of the cable is connected to a connection part of the device or apparatus. In this type of cable, a protector for covering an attaching part of the connector to prevent breakage or damage of the cable caused by an impact or bending or twisting action has been used in the past (see Patent Literature 1). The protector is fixed to a predetermined portion of the cable and formed not to move, so that an operator can grip the protector and connect the cable to the device or apparatus.

PRIOR ART

Patent Literature

Patent Literature 1: Japanese Patent Application Publication No. 2009-110888

SUMMARY OF THE INVENTION

Problem to be Solved

In the aforementioned operation, since the operator holds and rotates the protector and the cable to mount the connector to the connection part of the device or apparatus, actions such as twisting or bending the cable can inevitably occur in the process of the mounting operation. If such an impact or bending or twisting action is repetitively applied to the cable, the cable may be broken or damaged. In Particular, breakage or damage may occur at the connection part between a connector portion including a metal connection terminal and a leading end side of the cable covered with resin because the stress caused by the twisting or bending is concentrated on the portion made of a different material.

However, in the cable using the aforementioned protector, the torsional force caused by the protector gripped by the operator is directly applied to the cable particularly in relation to the twisting action during the cable mounting operation. As a result, the stress due to the twisting action may act on the connection part. Although an experienced operator would be careful not to create such a torsional movement insofar as possible, there are many cases where torsional force is inevitably applied during the operation in view of human engineering.

In light of the foregoing, an object of the present invention is to provide a technique capable of preventing breakage or damage of a cable by significantly reducing torsional force (torque) between the cable and the connector in comparison with prior arts when an operator holds an end portion (i.e., a portion to which the connector is connected) of the cable and takes a bending or torsional rotary action, and capable of further increasing durability and safety of the cable.

Means for Solving the Problem

In order to achieve the object, a cable according to the present invention comprises a cable body portion, a connector portion attached to a longitudinal end portion of the cable body portion, and a tube-shaped cable holder which covers at least one circumferential surface of the connector portion and the cable body portion and is provided to the cable body portion to be entirely or partially rotatable about a central axis line of the cable body portion.

According to the above configuration, even if twisting occurs in the cable during the operator holds the cable holder or a portion thereof, which serves as a protector, and connects the connector portion to a test equipment or the like, the cable body portion to which the connector portion is attached can freely rotate in compliance with the twisting of the cable relative to the cable holder which is gripped by the operator and restricted in its movement, so that it is difficult for the stress to act on a connector attaching part of the cable. Accordingly, even if such motions are made many times, it is possible to prevent breakage or damage of the cable at the connection part with the connector, and further increase durability and safety of the cable. In addition, although the cable body portion may have a circular shape in a cross-section, the cross-sectional shape of the cable body portion for providing aforementioned functional effects is not limited to the circular shape. For example, even if the cross-sectional shape of the cable body portion is polygonal, the cable body portion may be formed to be rotatable by providing a gap between the cable body portion and the cable holder. Likewise, even if the cross-sectional shape of the cable body portion is polygonal, the cable holder can also be formed to be rotatable, for example, by mounting an adapter on a portion to which the cable holder is attached and forming the combined cable body portion and adapter into a circular shape in a cross-section. Moreover, the (cross-sectional) shape of the connector portion is not limited, and the shape of the cable holder is also not limited insofar as tube-shaped such as a cylindrical tube, polygonal tube, etc. Further, in order to provide aforementioned functional effects, the cable holder may cover at least one circumferential surface of the connector portion and the cable body portion, and thus includes a case of covering both the connector portion and the cable body portion, and a case of covering either the connector portion or the cable body portion. Furthermore, the cable holder may be provided to the cable body portion such that it is formed to be entirely as well as partially rotatable about the central axis line of the cable body portion. Also, the cable holder may be provided to be rotatable relative to the cable body portion, and may not be fixedly attached to a certain place. For example, the cable holder may be formed such that, in case of non-use (no operation), the cable holder is set to freely move while penetrated by the cable body portion, so that it is not placed near the cable body portion and the connector portion, but in case of use (operation), it can be used after moved to the vicinity of the cable body portion and the connector portion when required.

The cable holder may preferably be made of a flexible material. According to this configuration, the cable can be effectively protected from breakage or damage due to the bending or the like, so that durability and safety of the cable can be increased.

In addition, the cable holder may be formed such that a continuous ring groove is formed in a circumferential direction on an outer circumferential surface of the connector portion and an inner circumferential surface of the cable holder, and the cable holder is rotatably attached to the connector portion via a ring which is coupled to the ring groove. According to this configuration, the cable holder can be provided to the cable body portion such that it is rotatable about the central axis line of the cable body portion with a relatively simple construction and less components.

Further, the cable holder may be rotatably attached to the connector portion via ball bearings provided between the cable holder and the connector portion. According to this structure, the cable holder can be provided to the cable body portion such that it rotates smoothly about the central axis line of the cable body portion.

Furthermore, in the cable body portion and/or the connector portion, a ring-shaped stopper for stopping the cable holder in the vicinity of the cable body portion and/or connector portion may be provided. According to this construction, since the cable holder can be stopped in the vicinity of the cable body portion and/or the connector portion by means of the stopper provided to the cable body portion and/or the connector portion, it is possible to provide the aforementioned functional effects as well as to make the cable simple and easy to use. Herein, the expression "cable body portion and/or connector portion" is intended to include both cases as mentioned above, i.e., the case that the cable holder covers both of the cable body portion and the connector portion, and the case that the cable holder covers either the cable body portion or the connector portion.

Also, the cable holder may be detachably attached to the connector portion. For example, it may be convenient if the cable holder is formed to have a so-called "push-on" type structure so as to be detachable to the connector portion.

EMBODIMENTS FOR CARRYING OUT INVENTION

It is apparent that exemplary embodiments of the present invention, which will be described hereinafter, is not intended to limit the invention described in the claims. It is also apparent that the whole combination of the features described in the embodiments is not necessarily essential in constituting the present invention.

Figure 1:
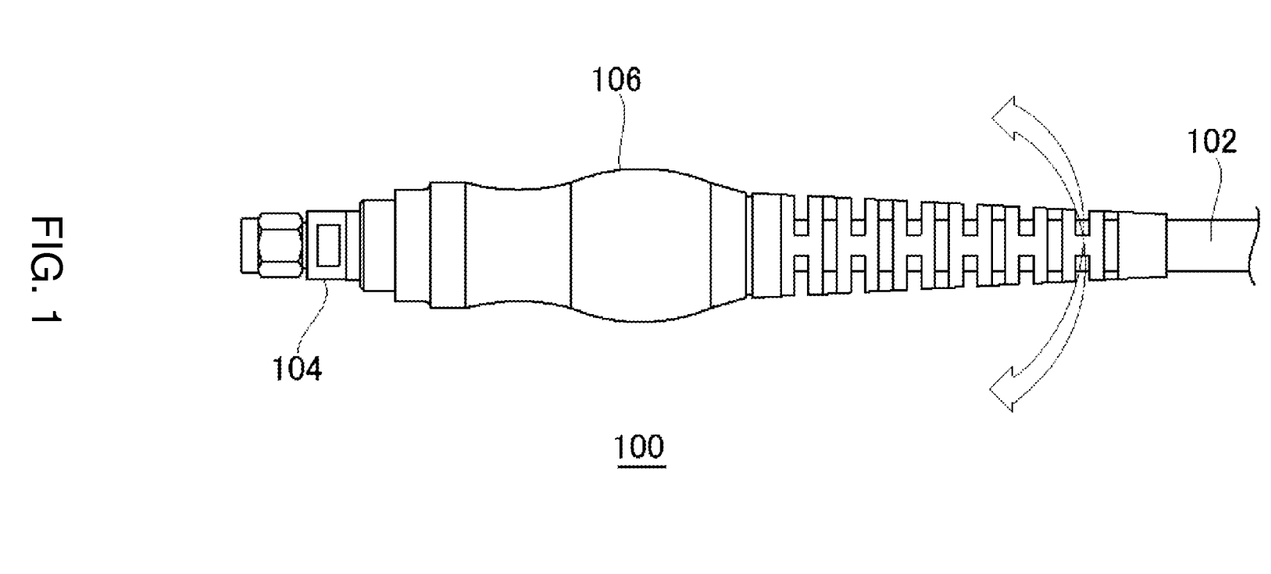
FIG. 1 is a diagram illustrating a basic structure of a cable according to the first embodiment of the present invention.

FIG. 1 is a diagram illustrating a cable according to the first embodiment of the present invention, and shows a basic structure of the cable of the present embodiment. Also, the cable 100 of the present embodiment is a so-called coaxial cable having a central conductor and an outer conductor, and can be used, for example, in a device for testing electrical properties of a test object. In the figures, however, only main parts of the present invention such as a cable body portion, a connector portion and a cable holder are shown in an enlarged view, and other parts such as a testing device, a probe for connecting the test object, etc. are omitted.

As shown in FIG. 1, the cable 100 of the present embodiment is provided with a cable body portion 102, a connector portion 104 attached to a longitudinal end portion of the cable body portion 102, and a strain relief 106 as a tube-shaped cable holder which covers a circumferential surface of the cable body portion 102 and is provided to the cable body portion 102 such that it is rotatable about a central axis line of the cable body portion 102, as shown by an arrow in the figure. Although the cable body portion 102 has a circular shape in a cross-section in the present embodiment, its cross-sectional shape is not limited to the circular shape. For example, even if the cross-sectional shape of the cable body portion 102 is polygonal, the cable body portion may be formed to be rotatable by providing a gap G, which will be explained later, between the cable body portion 102 and the strain relief 106 as the cable holder. Likewise, even if the cable body portion 102 is polygonal in a cross-section, the strain relief 106 can also be formed to be rotatable, for example, by mounting an adapter (not shown) on a portion to which the strain relief 106 is attached and forming the combined cable body portion 102 and adapter into a circular shape in a cross-section. In addition, the (cross-sectional) shape of the connector portion 104 is not limited, and the strain relief 106 has various tube shapes such as a cylindrical tube shape, a polygonal tube shape, etc. Further, although the strain relief 106 as the cable holder covers only a circumferential surface of the cable body portion 102 in the present embodiment, it may cover at least one circumferential surface of the connector portion 104 and the cable body portion 102. Accordingly, as an alternative example, covering both the connector portion 104 and the cable body portion 102, or covering only the connector portion 104 can also be considered. Further, in the present embodiment, the entire strain relief 106 is formed to be rotatable relative to the cable body portion 102. However, only a portion of the strain relief 106 may be formed to be rotatable relative to the cable body portion 102. Even in this case, the same functional effects as those of the present embodiment, which will be explained later with reference to FIGS. 3 and 4, can be provided by holding the portion of the strain relief 106 and conducting the operation. The strain relief 106 as the cable holder may also be formed to be rotatable relative to the cable body portion 102. For example, it may not be fixedly attached to the connector portion 104 and the like. For example, it may be formed such that, in case of non-use (no operation), the strain relief 106 is set to freely move while penetrated by the cable body portion 102, so that it is not placed near the cable body portion 102 and the connector portion 104, but in case of use (operation), it can be used after moved to the vicinity of the cable body portion 102 and the connector portion 104 when required.

The aforementioned strain relief 106 is made of flexible material, for example, such as PVC (Polyvinyl chloride).

However, general plastic material and rubber material can also be used as the flexible material. As such, since the strain relief 106 is made of flexible material, it surely has a function as a protector which protects the attaching part between the connector and the cable from an external force or an impact. In particular, the present embodiment is featured by having a function of relieving the strain generated by the stress due to the torsional rotation.

Figure 2:
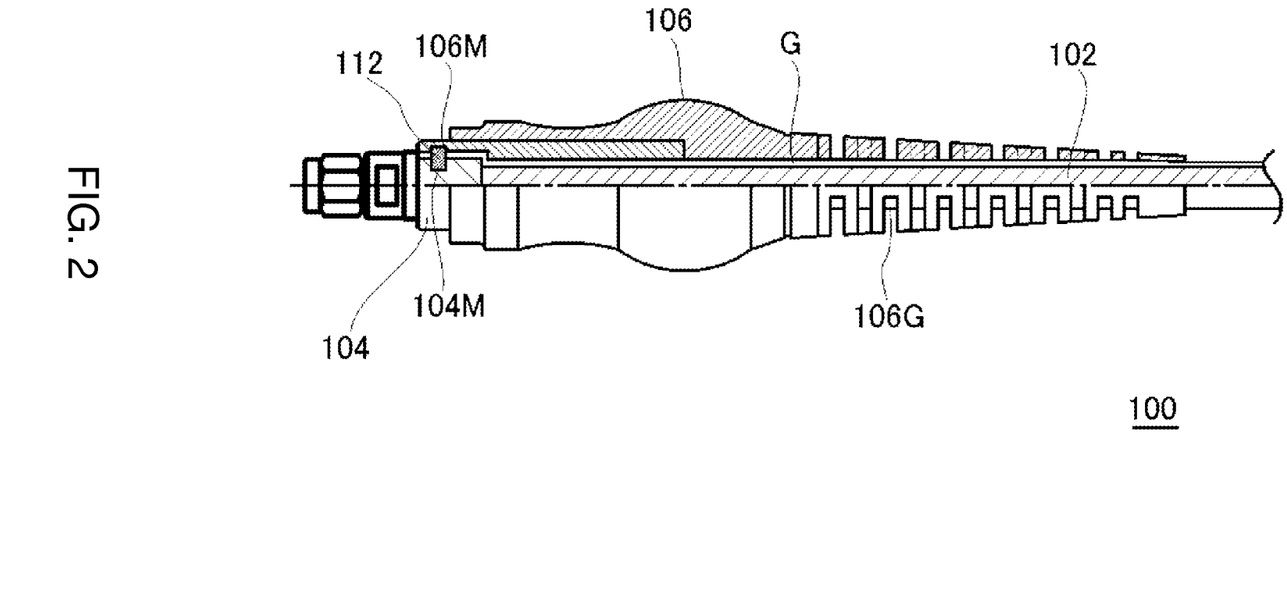
FIG. 2 is a partial cross-sectional view of the cable according to the first embodiment of the present invention.

That is, in the present embodiment, as shown in FIG. 2, an inner diameter of the strain relief 106 as the cable holder is formed greater than an outer diameter of the cable body portion 102, and a gap G is formed between the cable body portion 102 and the strain relief 106. The strain relief is thus formed to be able to rotationally move (rotatable) about the central axis line of the cable body portion 102 relative to the cable body portion 102. Although the gap G is formed between the cable body portion 102 and the strain relief 106 in the present embodiment, even if there is no gap in a strict sense, the strain relief 106 may be formed to be able to rotationally move (rotatable) about the central axis line of the cable body portion 102, for example, by sliding an inner circumferential surface of the strain relief and an outer circumferential surface of the cable body portion relative to each other. Moreover, in the cable of the present embodiment, ring grooves 104M, 106M, which are continuous in a circumferential direction, are provided on an outer circumferential surface of the connector portion 104 and the inner circumferential surface of the strain relief 106, respectively, so that the strain relief 106 is rotatably attached to the connector portion 104 via a ring 112 sandwiched between both circumferential surfaces.

That is, there are ring grooves 104M, 106M and the ring 112 is inserted into them, and the strain relief 106 itself is formed to rotate around the cable body portion 102. As such, in the present embodiment, the cable holder (strain relief) 106 is configured to freely make any rotations (rotate in 360° or more) about the central axis line of the cable body portion 102 relative to the cable body portion 102. The expression "rotatable" includes a concept of being movable in a rotational or rotary manner.

Further, as shown in FIGS. 1 and 2, the strain relief 106 as the cable holder is formed into a taper shape as a whole, in which the diameter of the opposite end side of the cable becomes thinner than that of the connector portion 104 side, and formed to include groove portions 106G in a spiral shape. It can thus be bent at the opposite end side of the cable softer than at the connector portion 104 side, so that the stress due to the aforementioned bending can also be reduced.

Figure 3:
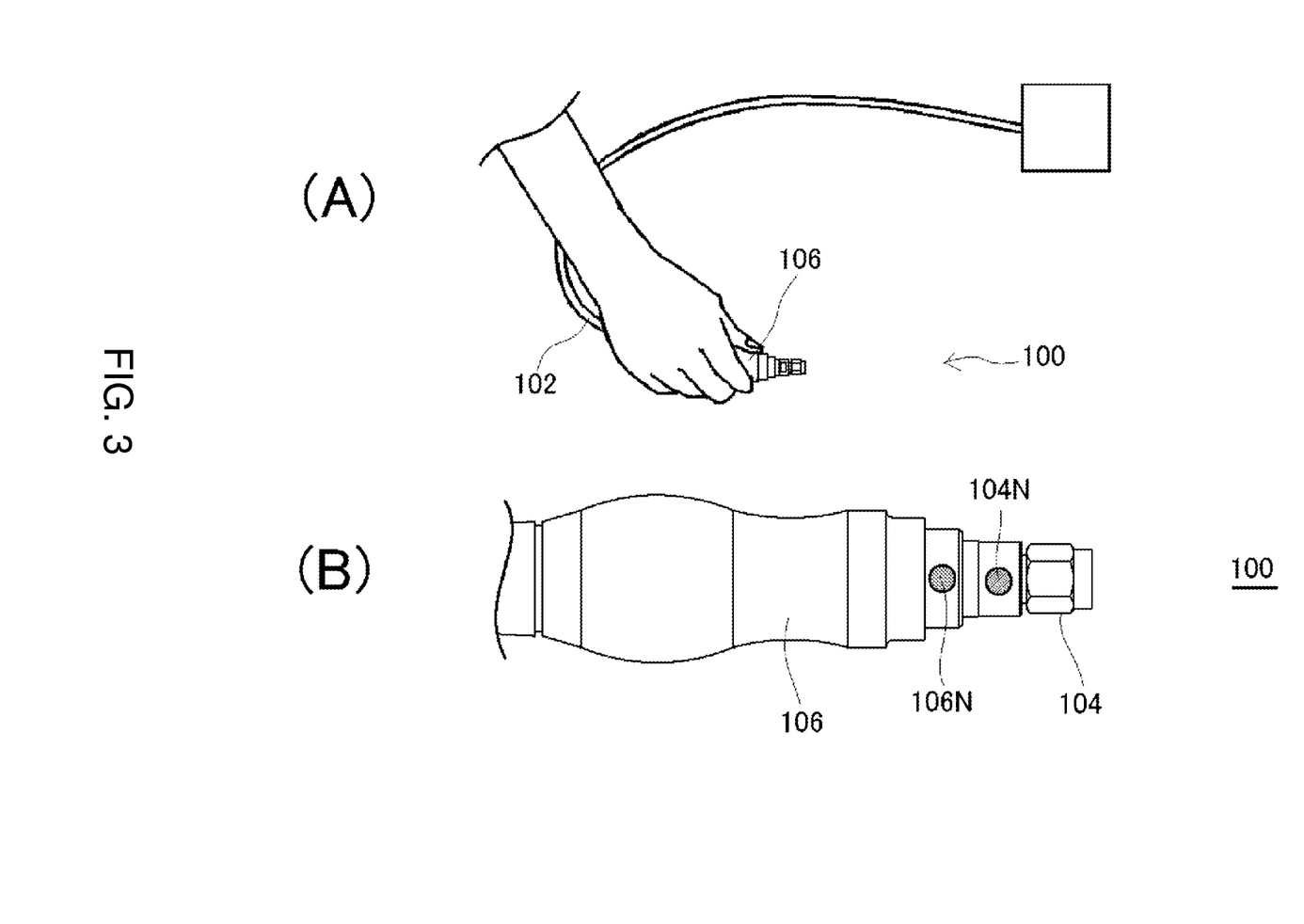
FIG. 3 is the first diagram illustrating using conditions and functional results of the cable according to the first embodiment of the present invention. Figure (A) shows a condition that the cable is in a free state and an operator holds a strain relief (protector) with one hand. Figure (B) is a partial enlarged view of the strain relief and a connector portion held by the operator.

FIG. 3 is the first diagram illustrating using conditions and functional results of the cable 100 according to the first embodiment of the present invention. FIG. 3(A) shows a condition that the cable 100 is in a free state and an operator holds the strain relief (protector) 106 with one hand. FIG. 3(B) is an enlarged view of the strain relief 106 and the connector portion 104 held by the operator (the operator's hand is omitted).

Figure 4:
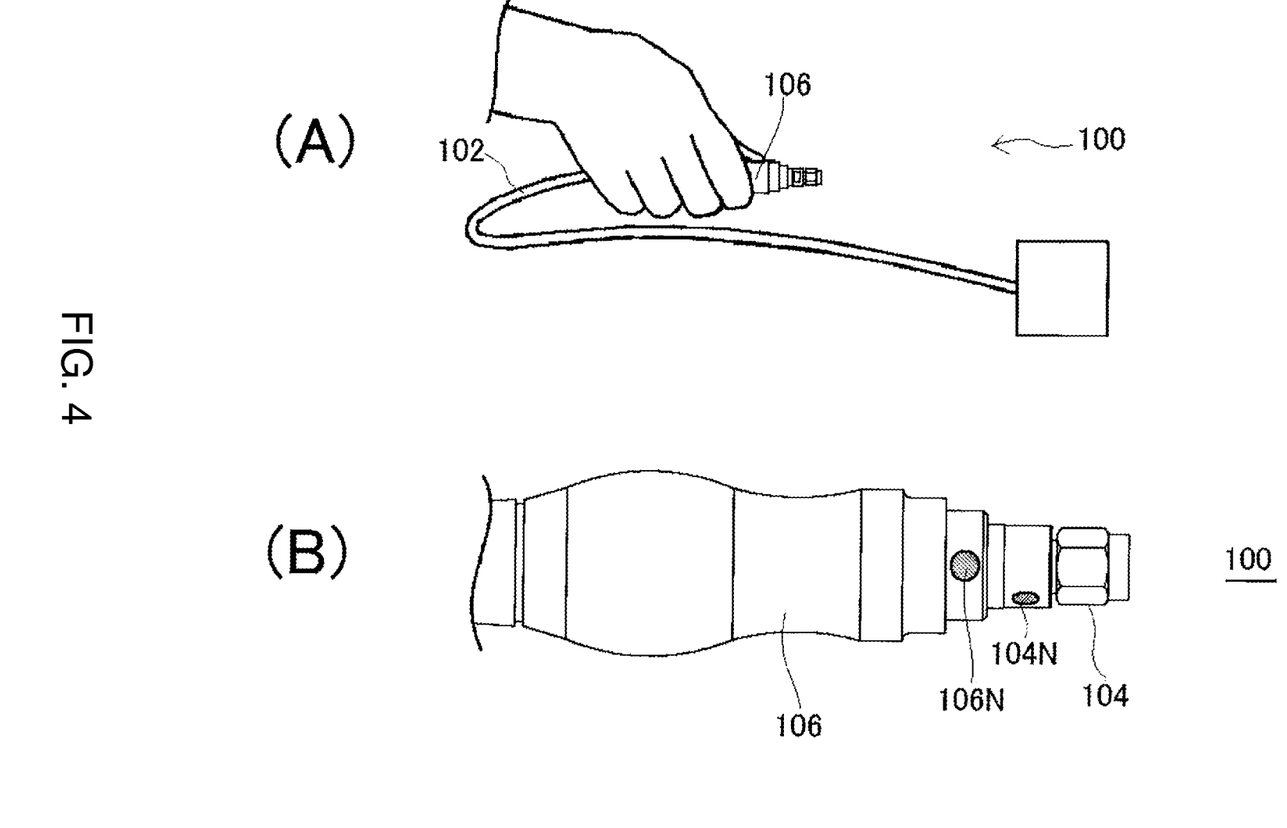
FIG. 4 is the second diagram illustrating using conditions and functional results of the cable according to the first embodiment of the present invention. Figure (A) shows a condition that the operator holds the strain relief with one hand and twists the cable by torsional action. Figure (B) is a partial enlarged view of the strain relief and the connector portion held by the operator.

Also, FIG. 4 is the second diagram illustrating using conditions and functional results of the cable 100 according to the first embodiment of the present invention. FIG. 4(A) shows a condition that the operator holds the strain relief with one hand and twists the cable by a torsional action. FIG. 4(B) is an enlarged view of the strain relief 106 and the connector portion 104 held by the operator in the state shown in FIG. 4(A) (the operator's hand is omitted).

That is, in the illustration of the condition, if the operator holds the strain relief 106 with his hand and frees the cable 100 from torsion, as shown in FIG. 3(A), a mark 104N provided in the connector portion 104 and a mark 106N provided in the strain relief 106 are correspondingly arranged each other, as shown in FIG. 3(B). However, if the cable 100 is twisted by a torsional action, as shown in FIG. 4(A), the mark 104N provided in the connector portion 104 and the mark 106N provided in the strain relief 106 are not correctly arranged each other, as shown in FIG. 4(B), because the strain relief 106 is not fixed to the cable body portion 102 with the connector portion 104, as in the cable 100 of the present embodiment.

Meanwhile, as in the past, if the protector (which is a member corresponding to the strain relief of the present embodiment) is fixed to the cable body portion on which the connector portion is mounted and does not move, it is twisted as much as the marks deviate from each other (for example, approximately 45°). Accordingly, as is apparent from FIGS. 3 and 4, it is understood that since the strain relief 106 is attached to the cable body portion 102 rotatably about the central axis line of the cable body portion 102, the stress applied to the connector 104 attaching part due to the twisting becomes 0 (zero).

As such, in the cable 100 of the present embodiment, even if the twisting occurs in the cable when the operator holds the cable holder 106 or a portion thereof and connects the connector portion 104 to a test equipment or the like, the cable body portion 102 to which the connector portion 104 is attached can freely rotate in compliance with the twisting of the cable 100 relative to the cable holder 106 whose movement is restricted by the operator's grip, so that it is difficult for the stress to act on the connector 104 attaching part of the cable 100. Accordingly, in the cable 100 of the first embodiment, even if such actions are made many times, it is possible to prevent breakage or damage of the cable 100 at the connection part with the connector 104, and to further increase durability and safety of the cable 100.

Figure 5:
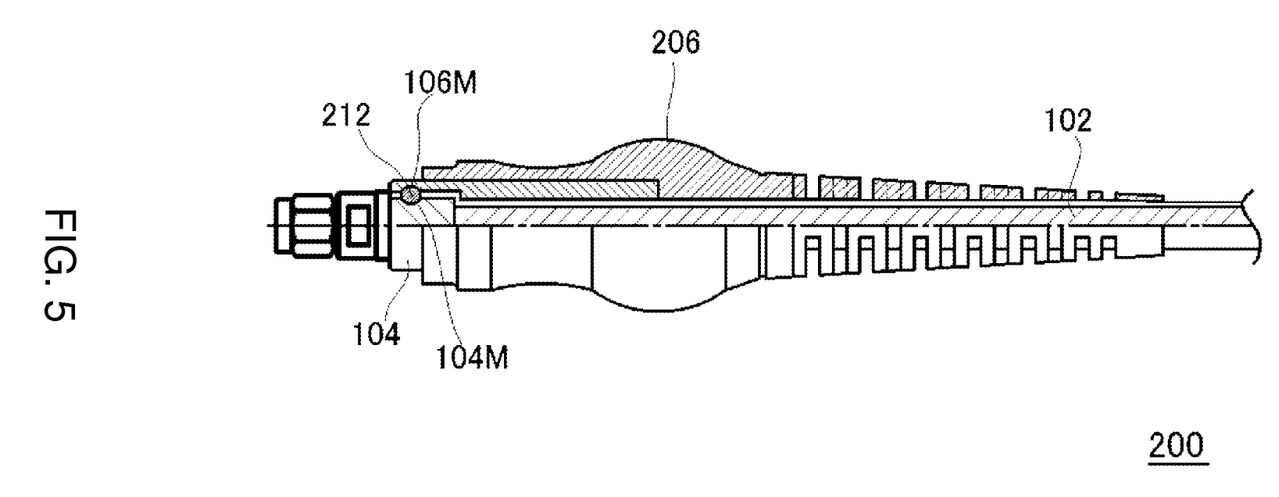
FIG. 5 is a partial cross-sectional view of a cable according to the second embodiment of the present invention.

FIG. 5 is a partial cross-sectional view of a cable 200 according to the second embodiment of the present invention, in which the same reference numerals are used for the same portions as the first embodiment. As shown in FIG. 5, a basic structure of the cable 200 of the present embodiment is identical to that of the cable according to the first embodiment described above. In the cable of the present embodiment, ring grooves 104M, 106M are provided in an inner circumferential surface of one member and an outer circumferential surface of the other member among the connector portion 104 and the strain relief 206. The strain relief 206 is rotatably attached to the connector portion 104 via a plurality of balls 212 (only one is shown) inserted between both circumferential surfaces. That is, the strain relief 206 as the cable holder is rotatably attached to the connector portion 104 via the ball bearings provided on the outer circumferential surface of the connector portion 104.

In the cable 200 of the present embodiment, since the strain relief 206 as the cable holder is rotatably attached to the connector portion 104 via the ball bearings 212 provided on the outer circumferential surface of the connector portion 104, it is possible to smoothly rotate the strain relief 206 about the central axis line of the cable body portion 102 via the ball bearings 212 relative to the cable body portion 102. The aforementioned functional effects as described with reference to FIGS. 3 and 4 can be thus obtained in the cable 200 of the present embodiment as well.

Accordingly, even if the twisting occurs in the cable when connected to a testing device and the like, it is difficult for the stress to act on the connector attaching part of the cable, as in the first embodiment described above. Therefore, even if such actions are made many times, it is possible to prevent breakage or damage of the cable at the connection part with the connector, so that durability and safety of the cable can be increased.

Also, as a modification of the cable 200 according to the second embodiment, balls and the like may be inserted into a groove and fixed thereto. That is, the strain relief may be formed just like a water hose, which can be removed from the connector portion when an upper portion of the strain relief slides down along the cable direction and the balls come out from the groove. In other words, the strain relief 206 as the cable holder may be detachably attached to the connector portion 104. For example, since the cable holder can be detachably attached to the connector portion with a so-called "push-on" type structure, it is very convenient.

Figure 6:
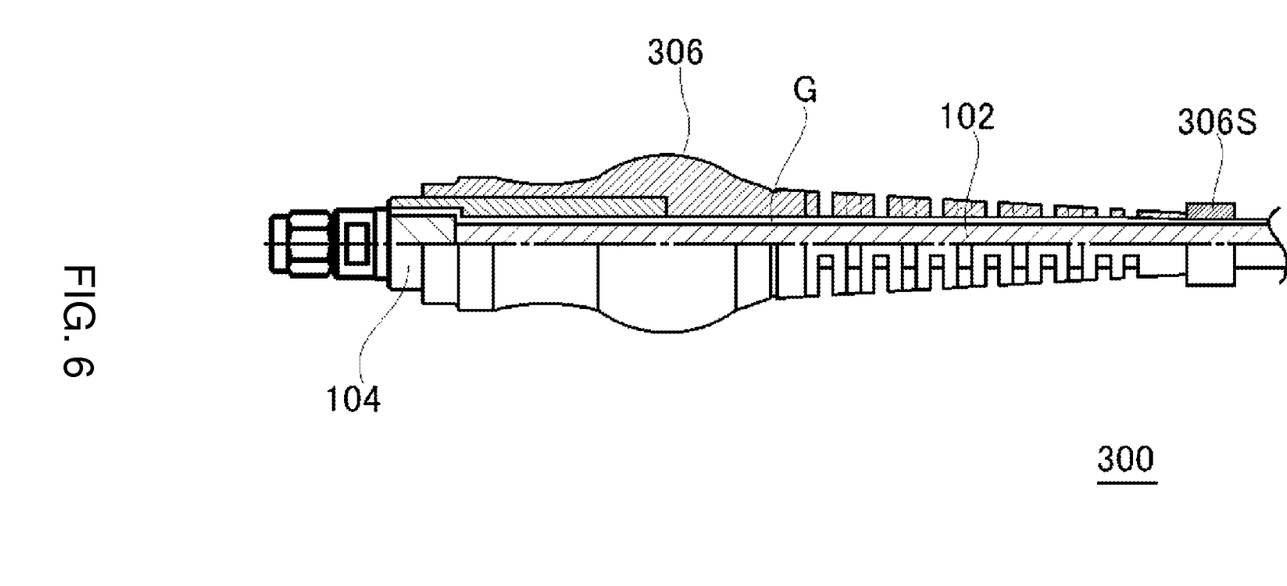
FIG. 6 is a partial cross-sectional view of a cable according to the third embodiment of the present invention.

FIG. 6 is a partial cross-sectional view of a cable 300 according to the third embodiment of the present invention, in which the same reference numerals are used for the same portions as the first and second embodiments. In the cable 300 of the present embodiment, as a stopper for stopping the strain relief 306 as the cable holder in the vicinity of the connector portion 104, a step portion 306S is provided at an end portion of the strain relief 306. This step portion 306S as the stopper is fixedly provided at a predetermined place of the cable body portion 102.

This step portion 306S as the stopper allows the strain relief 306 to be stopped (held) in the vicinity of the connector portion 104. Also, a gap G is formed between the cable body portion 102 and the strain relief 306, as in the first and second embodiments. With this configuration, the strain relief 306 is attached to the cable body portion rotatably about the central axis line of the cable body portion 102 relative to cable body portion 102. In the present embodiment, an inner diameter of the strain relief 306 as the cable holder is formed greater than an outer diameter of the cable body portion 102.

In the cable 300 of the present embodiment, the strain relief 306 can be provided to the cable body portion 102 to rotate about the central axis line of the cable body portion 102 by sliding the inner circumferential surface of the strain relief 306 and the outer circumferential surface of the cable body portion 102 relative to each other. By providing the stopper (step portion) 306S to the cable body portion 102, the strain relief 306 can be stopped in the vicinity of the connector portion 104. Thus, with an extremely simple configuration, the strain relief 306 can be provided to the cable body portion 102 to rotate about the central axis line of the cable body portion 102.

It is a matter of course that aforementioned functional effects as illustrated in FIGS. 3 and 4 can be obtained also in the cable of the present embodiment. Accordingly, even if the twisting occurs in the cable, it is difficult for the stress to act on the connector attaching part of the cable, as in the first and second embodiments described above. Therefore, even if such operations for connecting the cable to a testing device or the like are made many times, it is possible to prevent breakage or damage of the cable, so that durability and safety of the cable can be increased.

Further, in the aforementioned embodiment, the cable holder (strain relief) is provided to the cable body portion such that it makes free rotations (rotates in 360° or more) about the central axis line of the cable body portion. However, it is also possible to form the strain relief to be rotatable only within a range of a predetermined angle (for example, within the range of 270° or the like), without rotating in 360° or more. Moreover, in the aforementioned embodiment, the entire cable holder (strain relief) is formed to be rotatable about the central axis line of the cable body portion relative to the cable body portion. However, only a portion (gripped by an operator) of the cable holder (strain relief) may be formed to freely rotate or rotationally move (rotatable). In addition, in the aforementioned embodiment, the cable holder (strain relief) is made of flexible material. However, material of the strain relief is not limited to a flexible one. The strain relief can also be formed to have partial flexibility.

Furthermore, in the first and second embodiments, the inner diameter of the cable holder 106 is formed greater than the outer diameter of the cable body portion 102. However, a partially different modification can also be considered. For example, the cable body portion may be circular in a cross-section as a whole, and may have thick portions and thin portions in the outer sheath, which forms continuous mountains and valleys in an alternate manner. The inner diameter of the cable holder may also be formed like continuous mountains and valleys. Accordingly, by engaging mountains and valleys of both members with each other, the cable holder can be formed to be rotatable. Also, in the third embodiment described above, the strain relief 306 as the cable holder is formed to cover both the connector portion 104 and the cable body portion 102. However, it may be formed to cover either one. Thus, the stopper may be provided to both the cable body portion and the connector portion, or to only either one.

INDUSTRIAL APPLICABILITY

In the embodiments described above, the cable according to the present invention is explained on the premise of a coaxial cable. However, types of cable are not limited to the coaxial cable insofar as the cable needs a connecting operation where an operator should hold and connect the cable to a connector or the like each time. In addition, the use of the cable is not limited to an industrial cable for testing an electrical component. For example, it can be applicable to various uses of the cable such as the cable for connection with a PC or the like at home. Further, in the aforementioned embodiment, explanation is made to such a case that the connector portion is attached to the cable body portion and the tube-shaped cable holder covers either one circumferential surface of the connector portion and the cable body portion. However, from a point of view "to prevent twisting of the cable," for example, it is possible to consider such a configuration as an improved aspect of the present invention that a jig is attached to a wall, and the jig and the cable are rotatably connected.

DESCRIPTION OF REFERENCE NUMERALS 100 cable
102 cable body portion
104 connector portion
104M ring groove
106 cable holder
106M ring groove
112 ring
200 cable
206 cable holder
212 ball (ball bearing)
300 cable
306 cable holder
306S stopper (step portion)

The invention claimed is:

1. A cable comprising: a cable body portion; a connector portion attached to a longitudinal end portion of the cable body portion; and a tube-shaped cable holder which covers at least one circumferential surface of the connector portion and the cable body portion, wherein the cable holder is disposed in the a vicinity of the cable body portion and the connector portion, with a rotational axis coincident with a central axis of the cable body portion via a ring or a ball bearing, the cable holder being provided to be entirely or partially rotatable, in 3600 or more in a circumferential direction, about a central axis line of the cable body portion relative to the cable body portion, and held when connected to the connector portion;

wherein a continuous ring groove is formed in a circumferential direction on an outer circumferential surface of the connector portion and an inner circumferential surface of the cable holder, and the cable holder is rotatably attached to the connector portion via the ring or the ball bearing which is coupled to the ring groove.

2. The cable according to claim 1, wherein the cable body portion has a circular shape in a cross-section.

3. The cable according to claim 1, wherein the cable holder is made of flexible material.

4. The cable according to claim 1, wherein the cable holder is rotatably attached to the connector portion via the ball bearing provided between the cable holder and the connector portion.

5. The cable according to claim 1, wherein, in the cable body portion and/or the connector portion, a ring-shaped stopper for stopping the cable holder in the vicinity of the cable body portion and/or the connector portion is provided.

6. The cable according to claim 2, wherein the cable holder is made of flexible material.

7. The cable according to claim 2, wherein the cable holder is rotatably attached to the connector portion via the ball bearing provided between the cable holder and the connector portion.

8. The cable according to claim 3, wherein the cable holder is rotatably attached to the connector portion via the ball bearing provided between the cable holder and the connector portion.

9. The cable according to claim 2, wherein, in the cable body portion and/or the connector portion, a ring-shaped stopper for stopping the cable holder in the vicinity of the cable body portion and/or the connector portion is provided.

10. The cable according to claim 3, wherein, in the cable body portion and/or the connector portion, a ring-shaped stopper for stopping the cable holder in the vicinity of the cable body portion and/or the connector portion is provided.

* * * * *

UNITED STATES PATENT AND TRADEMARK OFFICE
CERTIFICATE OF CORRECTION

PATENT NO. : 9,318,839 B2
APPLICATION NO. : 14/424606
DATED : April 19, 2016
INVENTOR(S) : Yuta Tsukahara and Hiromi Yasumoto Page 1 of 1

It is certified that error appears in the above-identified patent and that said Letters Patent is hereby corrected as shown below:

Claims

Column 8:

In line 67, claim 1, delete the word "the" (first occurrence).

Signed and Sealed this
Twelfth Day of July, 2016

Michelle K. Lee
*Director of the United States Patent and Trademark Office*